United States Patent
Fontaine et al.

(10) Patent No.: US 11,588,784 B2
(45) Date of Patent: Feb. 21, 2023

(54) MULTIPLE ADDRESSING ACCESS DEVICE

(71) Applicant: ORANGE, Issy-les-Moulineaux (FR)

(72) Inventors: Fabrice Fontaine, Chatillon (FR);
Herve Marchand, Chatillon (FR)

(73) Assignee: ORANGE, Issy-les-Moulineaux (FR)

(*) Notice: Subject to any disclaimer, the term of this patent is extended or adjusted under 35 U.S.C. 154(b) by 0 days.

(21) Appl. No.: 15/915,607

(22) Filed: Mar. 8, 2018

(65) Prior Publication Data
US 2018/0255019 A1    Sep. 6, 2018

(30) Foreign Application Priority Data
Mar. 3, 2017   (FR) ...................................... 1751754

(51) Int. Cl.
*G06F 15/16*     (2006.01)
*G06F 9/54*      (2006.01)
(Continued)

(52) U.S. Cl.
CPC ...... *H04L 61/5069* (2022.05); *H04L 61/5038* (2022.05); *H04L 65/104* (2013.01);
(Continued)

(58) Field of Classification Search
CPC ............. H04L 61/2069; H04L 61/2038; H04L 65/104; H04L 65/4084; H04L 67/14;
(Continued)

(56) References Cited

U.S. PATENT DOCUMENTS

| | | | |
|---|---|---|---|
| 7,924,804 B2* | 4/2011 | Wengerter | .............. H04L 47/14 370/322 |
| 8,230,050 B1* | 7/2012 | Brandwine | ......... H04L 41/0803 709/220 |

(Continued)

FOREIGN PATENT DOCUMENTS

| | | |
|---|---|---|
| EP | 2023531 A1 | 2/2009 |
| JP | 5180048 B2 * | 4/2013 |

OTHER PUBLICATIONS

English translation of the French Written Opinion for corresponding French Application No. 1751754, filed Mar. 3, 2017.
(Continued)

*Primary Examiner* — Hamza N Algibhah
(74) *Attorney, Agent, or Firm* — David D. Brush; Westman, Champlin & Koehler, P.A.

(57) ABSTRACT

A method and a device for managing a remote communication service (streaming) between a terminal in a communications network and an object of a local area network. The terminal and the object are capable of communicating via a gateway of the local area network. The method includes the following steps on a service provision device providing the service: establishing a list of associations between an address for accessing the object and at least one feature of the service; obtaining at least one criterion linked to the terminal; selecting at least one association in the list of associations according to said criterion; and sending to the terminal at least one address associated with said at least one selected association.

14 Claims, 2 Drawing Sheets

(51) Int. Cl.

| | | |
|---|---|---|
| *H04L 29/06* | (2006.01) | |
| *H04L 61/5069* | (2022.01) | |
| *H04L 67/04* | (2022.01) | |
| *H04L 61/5038* | (2022.01) | |
| *H04L 65/612* | (2022.01) | |
| *H04L 67/51* | (2022.01) | |
| *H04L 67/56* | (2022.01) | |
| *H04L 65/1033* | (2022.01) | |
| *H04L 67/14* | (2022.01) | |

(52) U.S. Cl.
CPC ............ *H04L 65/612* (2022.05); *H04L 67/04* (2013.01); *H04L 67/14* (2013.01); *H04L 67/51* (2022.05); *H04L 67/56* (2022.05)

(58) Field of Classification Search
CPC . H04L 67/04; H04L 61/5069; H04L 61/5038; H04L 67/51; H04L 67/56; H04L 65/612
USPC .......................................................... 709/245
See application file for complete search history.

(56) References Cited

U.S. PATENT DOCUMENTS

| | | | | |
|---|---|---|---|---|
| 10,366,240 | B1* | 7/2019 | Maman .................... G06F 21/33 | |
| 10,602,365 | B2* | 3/2020 | Lee ........................ H04W 84/10 | |
| 2003/0223429 | A1* | 12/2003 | Bi ........................... H04L 47/11 | 370/395.4 |
| 2005/0018690 | A1* | 1/2005 | Kilkki ..................... H04L 47/10 | 370/395.6 |
| 2005/0249146 | A1* | 11/2005 | Pinault ................. H04M 7/0009 | 370/328 |
| 2006/0111082 | A1* | 5/2006 | Zhang .................... H04W 12/06 | 455/411 |
| 2007/0041377 | A1* | 2/2007 | Song ...................... H04H 20/59 | 370/389 |
| 2007/0058792 | A1 | 3/2007 | Chaudhari et al. | |
| 2008/0162924 | A1* | 7/2008 | Chinitz ................... H04L 63/20 | 713/153 |
| 2008/0313273 | A1* | 12/2008 | Wang ...................... H04L 67/16 | 709/203 |
| 2010/0217837 | A1* | 8/2010 | Ansari .................... H04L 67/16 | 709/218 |
| 2010/0235433 | A1* | 9/2010 | Ansari ................ H04L 12/2818 | 709/203 |
| 2010/0309784 | A1* | 12/2010 | Mihaly ............. H04L 29/12066 | 370/230 |
| 2013/0097289 | A1* | 4/2013 | Alsterlid ................. H04L 67/00 | 709/219 |
| 2013/0305322 | A1* | 11/2013 | Raleigh ................. H04W 12/08 | 726/4 |
| 2013/0315144 | A1* | 11/2013 | Karaoguz ............... H04L 47/15 | 370/328 |
| 2014/0072032 | A1* | 3/2014 | Melnyk ................... H04L 47/32 | 375/240.02 |
| 2014/0206349 | A1* | 7/2014 | Bertrand ............. H04W 40/246 | 455/434 |
| 2016/0180062 | A1* | 6/2016 | Evans ................... G06Q 20/123 | 726/28 |
| 2016/0254962 | A1* | 9/2016 | Ansari ................ H04L 12/2803 | 709/225 |
| 2017/0054639 | A1 | 2/2017 | Zhou et al. | |

OTHER PUBLICATIONS

French Search Report dated Nov. 20, 2017 for corresponding French Application No. 1751754, filed Mar. 3, 2017.
Written Opinion dated Nov. 20, 2017 for corresponding French Application No. 1751754, filed Mar. 3, 2017.

* cited by examiner

MULTIPLE ADDRESSING ACCESS DEVICE

TECHNICAL FIELD

The invention relates to the general field of telecommunication networks and more particularly to communications between an object connected to a local area network and a terminal.

In general, the invention applies to the equipment of such a network.

PRIOR ART

A local area network, also subsequently termed a home network, is a computer network that links together, in a wired or wireless manner, the terminal equipment, or more simply terminals, in a house (computers, peripherals for printing, storage, connected objects, etc.), capable of communicating with each other. A home network comprises a router, also commonly known as a gateway, an intermediate element that redirects, or routes, data packets between the various terminals and networks connected thereto. The user of such a network may execute a given service on a given terminal having specific features (e.g. controlling a camera, opening a door, etc.), from their local area network (also known as a LAN) or from a broadband network (also known as a WAN) via the gateway.

Such a terminal is subsequently termed a connected object (in English: IoT for Internet of Things).

The number of these connected objects, image-taking devices, or cameras, is expanding considerably. The user must now configure the gateway for accessing the multimedia data stream (images, sound, video) of a camera connected from outside their home. This configuration makes it possible to access the stream via the gateway, by connecting thereto on a specific address assigned to the stream, from the local area network or a broadband network. However, this assignment is rarely optimal with respect to the features of the stream. It is desirable, in some cases, to receive suitable streams in terms of latency, bitrate, transport protocol, etc. However, according to the prior art, irrespective of the desirable features for the user, once they have registered with the service, they continue, regardless of the features of their terminal (network support, capacity, etc.), to access the same service stream with the same features. For example, when the user enters their home, they continue to access the stream as if they were outside the local area network. The stream that they receive is no longer necessarily suitable in terms of latency and quality of the video. Moreover, this is expensive since they continue to mobilize resources of the gateway and the wide area network unnecessarily for controlling the connected object.

The invention offers a solution not exhibiting the drawbacks of the prior art.

THE INVENTION

For this purpose, according to a functional aspect, the subject matter of the invention is a method for managing a remote communication service between a terminal in a communications network and an object of a local area network, the terminal and the object being capable of communicating via a gateway of the local area network, said method being characterized in that it comprises the following steps on a service provision device providing the service:

establishing a list of associations between an address for accessing the object and at least one feature of the service;
obtaining at least one criterion linked to the terminal;
selecting at least one association in the list of associations according to said criterion;
sending to the terminal at least one address associated with said at least one selected association.

"Communication service", is understood here to mean a service offered by the object of the local area network associated with the gateway, e.g. the provision of a video stream by a camera, or files by a network drive, etc.

"Remote communication service", is understood to mean that this service may be accessed from outside the local area network of the connected object, notably from a wide area or broadband network, also known as a WAN (for Wide Area Network).

"Address of the service", is understood to mean the address, e.g. a URL, at which the desired service is accessible (e.g. the address for obtaining the video stream streamed from the camera).

"Feature of the service" is understood to mean any technical feature which may be associated with the service: bitrate, quality, etc. of the multimedia streams, type(s) of protocol supported, type(s) of coding offered, etc.

"Criterion linked to the terminal" is understood to mean any criterion relating to a terminal at a given instant: available bitrate (on the network; e.g. the ADSL uplink, limited to 1 Mbps (megabits per second) is congested and only 256 Kbps are available at this instant), effective (supported) bitrate, type(s) of protocol supported, type(s) of coding, etc.

Thus, the invention makes it possible for the terminal, located either in the wide area network, or in the local area network, to request the service provision device providing the service, which is located, for example, on the service gateway, for an address for accessing the service of the connected object (e.g. the video stream). The device analyzes a criterion received from the terminal and compares it with a list of previously established associations for the service. Each association corresponds to a certain number of features of the service (bitrate, local/remote terminal, protocol, etc.). Each association also comprises at least one local or remote address. By comparing the criterion obtained from the terminal (indicating, for example, that the terminal is local/remote, or that it can support a maximum bitrate) with the features of the associations, one association and therefore at least one address is selected in the list and transmitted to the terminal. Advantageously this makes it possible for the terminal simply to have the best service (best suited stream) at a given moment.

According to a particular implementation of the invention, a process such as that described above is further characterized in that the selection step for selecting at least one association is preceded by steps of:

sending to the terminal an address of the service gateway;
receiving, from the terminal, a request for accessing the service;
determining at least said criterion according to the request received.

This implementation of the invention makes it possible to supply a generic address of the service to the terminal, without initially worrying about knowing the features thereof. Secondly, just before the actual provision of the service (receiving the stream), a step of determining the criterion relating to the terminal makes it possible to select the correct association and to supply the correct address to the terminal, i.e. the address that offers the best service (stream) possible. Advantageously according to this implementation, the terminal always uses the same generic address regardless of its location, the bitrate of the support network, etc. Its features may therefore change over time (the user enters the local area network, for example) without it being necessary to modify this address.

According to another particular implementation of the invention, which may be implemented alternatively or cumulatively with the preceding one,
the feature of the service is related to a connection criterion indicating whether the terminal is connected to the local area network of the service gateway;
the criterion linked to the terminal indicates whether the terminal is connected to the local area network of the service gateway.

Advantageously according to this implementation, one or more associations may be based on the fact that the terminal is local or remote. The choice of the association will be made according to this criterion. This makes it possible for the terminal to benefit from a local address if it is local and a remote address if it is remote, and from the features of the associated stream that are appropriate to local use (higher and constant bitrate, low latency, encryption not necessary, etc.) or remote use (lower but adaptive bitrate, higher latency, encryption necessary, etc.).

According to a variant of this implementation, the selection step determines:
a first association for a connection criterion indicating that the terminal is connected to the local area network of the service gateway;
a second association for a connection criterion indicating that the terminal is not connected to the local area network of the service gateway;
and the step of sending transmits to the terminal the address of the first association and the address of the second association that have been determined.

Advantageously according to this implementation, the method according to the invention transmits two addresses to the terminal: a remote address and a local address; subsequently, if the terminal wants to access the object while it is inside the local area network, advantageously it will be able to use the local address. Otherwise it will be able to use the remote address. The gateway conventionally (by means of a NAT) redirects addresses, i.e. establishes a "route" allowing access from outside the local area network (on the outside address) to the service of the connected object (on a local address).

This makes it possible for the terminal to decide, according to the place where it is located (inside or outside the local area network) to use the one or the other address intelligently. Indeed, when the user enters the house (and therefore into the range of its local area network) it is simpler and cheaper to access the object via its local area network address (which avoids using the NAT router, etc.).

According to another particular implementation of the invention, which may be implemented alternatively or cumulatively with the preceding ones,
the feature of the service is related to a bitrate criterion (COD, BR).
the criterion linked to the terminal indicates the useful bitrate of the terminal.

Advantageously according to this implementation, the method according to the invention makes it possible for the terminal to receive streams suited to its capabilities in terms of bitrate. Different addresses may, according to the invention, be associated with multiple streams encoded at multiple bitrates. The address corresponding to the bitrate criterion of the terminal is then supplied to said terminal.

According to another particular implementation of the invention, which may be implemented alternatively or cumulatively with the preceding ones:
the feature of the service indicates the protocol used for communication;
the step of determining at least said feature determines whether the terminal is capable of managing this type of protocol in said communication network.

Advantageously according to this implementation, the method according to the invention makes it possible for the terminal to receive the streams according to streaming protocols suited to its capabilities (is it capable, in terms of hardware and software, of processing this type of protocol, e.g. HLS/HTTP?) and to the communication support network in which it is located (do the components of the network allow this type of protocol to pass through? does the security of the network allow it? etc.). Different addresses may, according to the invention, be associated with multiple streaming protocols (of the HTTP, RTSP family, etc.). The address corresponding to the most suitable protocol at a given moment is then supplied to said terminal.

According to another particular implementation of the invention, which may be implemented alternatively or cumulatively with the preceding ones, the method is characterized in that it also comprises a step of discovery of the connected object.

The step of discovery makes it possible for the device implementing the method to take over all the features of the connected object and therefore of the service offered to the user (types of streams, bitrates, supported protocols, etc.). Such a step may advantageously be standardized, e.g. by using a known discovery protocol in a local area network (UPnP, DLNA, etc.).

According to another functional aspect, the subject matter of the invention is an access method, on a terminal in a communications network, for accessing a remote communication service between the terminal and an object of a local area network, the terminal and the object being capable of communicating with a gateway of the local area network, said method being characterized in that it comprises the following steps on the terminal:
receiving a notification message from a service provision device providing the service, said notification message comprising two addresses for accessing the service;
obtaining a criterion relating to the terminal;
selecting an address for accessing the service from the two addresses according to said parameter relating to the terminal.

Advantageously according to this aspect, the terminal acquires two addresses: the first enables it to access the service locally, directly, the second enables it to access the service from outside the local area network. The terminal itself is capable, according to this aspect, of choosing the appropriate address for accessing the stream, according to a criterion that is specific thereto (bitrate, quality, protocol, etc.).

According to a hardware aspect, the invention also relates to a device for managing a remote communication service between a terminal in a communications network and an object of a local area network, the terminal and the object being capable of communicating via a gateway of the local area network, the device being characterized in that it comprises the following modules:

a module for establishing at least one association between an address for accessing the object and at least one feature of the service;

a module for obtaining at least one criterion linked to the terminal;

a selection module for selecting at least one association in the list of associations according to said criterion;

a module for sending to the terminal at least one address associated with said at least one selected association.

The term module used in the present description may equally correspond to a software component or a hardware component or a set of hardware and software components, a software component itself corresponding to one or more computer programs or subprograms or more generally to any element of a program capable of implementing a function or a set of functions such as those described for the modules concerned. In the same way, a hardware component corresponds to any element of a set of hardware capable of implementing a function or a set of functions for the module concerned (integrated circuit, smart card, memory card, etc.).

According to another hardware aspect, the invention also relates to a gateway including a device for managing a remote communication service such as that previously described.

According to another hardware aspect, the invention relates to a terminal in a communications network for using a remote communication service with an object of a local area network, the terminal and the object being capable of communicating with a gateway of the local area network, said terminal comprising the following modules:

a module for receiving a notification message from a service provision device providing the service, said notification message comprising two addresses for accessing the service;

a module for obtaining a criterion relating to the terminal;

a selection module for selecting an address for accessing the service from the two addresses according to said parameter relating to the terminal.

According to another hardware aspect, the invention further relates to a computer program capable of being implemented on a provision device as described above, the program including code instructions which, when the program is executed by a processor, performs the steps of the method for managing a remote communication service between a terminal and an object of a local area network defined above.

According to yet another hardware aspect, the invention relates to a computer program capable of being implemented on a terminal such as that described above, the program including code instructions which, when the program is executed by a processor, performs the steps of the method for accessing a remote communication service between a terminal and an object of a local area network defined above.

According to yet another hardware aspect, the invention relates to a recording medium readable by a data processor on which a program is recorded including program code instructions for executing the steps of any one of the methods defined above.

The objects according to the hardware aspects of the invention provide at least the same advantages as those provided by the method according to the first functional aspect. The optional features mentioned for the first aspect may be applied to the hardware aspects.

The invention will be better understood on reading the description that follows, given by way of example and referring to the attached drawings.

THE FIGURES

DETAILED DESCRIPTION OF AN EMBODIMENT ILLUSTRATING THE INVENTION

Figure 1:
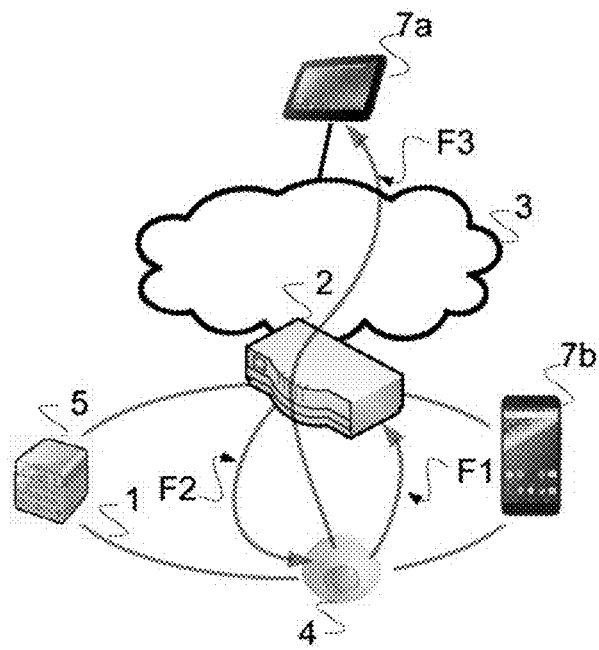
FIG. 1 represents the general context of the invention.

FIG. 1 represents the general context of the invention according to the prior art, in which a telecommunication network comprises a local area network or LAN (Local Area Network) 1, also known as a home network, and a wide area network, or WAN (Wide Area Network), 3. According to this example, the WAN network is an Internet network. More broadly, the network 3 could be of any type (cellular, GSM—Global System for Mobile Communications, UMTS—Universal Mobile Telecommunications System, Wi-Fi—Wireless, etc.) without departing from the scope of the invention. The local area network 1 includes a gateway 2, e.g. a Livebox type, connected to the Internet network 3. The local area network 1 also includes a set of terminals, according to the example a camera 4 and a NAS (for "Network Access Storage") type hard disk 5. The equipment 4, 5 is connected to the gateway 2, in a wired or wireless manner, in the local area network.

The gateway further provides a range of remote access services to a set of clients such as, for example, a user of the terminals 7a and 7b.

The client terminal 7a is in this example a computer tablet, and the client terminal 7b a smartphone type of mobile; both terminals have associated computer and Internet navigation functions that make them capable of communicating on the Internet network (3), or on the local area network (1), with the equipment 2, 4, 5. In this example, the client terminal wishes to access the camera 4 stream, i.e. the remote multimedia service provided by the camera 4. The client terminal 7a/7b has, for example, a Web client; an application page of the remote service is typically presented on the terminal 7a/7b by means of a Web browser that allows it to receive and display the camera 4 stream.

Hereafter, "service" is understood to mean any communication between a terminal and an object of the local area network, and "terminal", or "client terminal" is understood to mean any device (tablet, smartphone, laptop, etc.) capable of connecting to and accessing the local area network via the service gateway 2, either "locally" like the terminal 7b in the example (i.e. it is connected to the gateway in the local area network) or "remotely" like the terminal 7a (i.e. it is connectable to the service gateway from the wide area network). A given terminal may be mobile, sometimes locally (when the user is at home, for example) and sometimes remotely (when the user is at work, for example).

Conventionally, the terminal receives, according to this example, the stream from the camera (the service) in a progressive download or "streaming", typically by using one of the HTTP/HTTPS or RTSP families of protocols. It is recalled that:

HTTP (from the English Hyper Text Transport Protocol) is a client-server communication protocol developed for Internet networks. HTTPS is a secure version of HTTP. Often, in this context of the HTTP protocol, an HTTP "adaptive streaming" (HAS for "HTTP Adaptive Streaming") technique is used for exchanging data between the client terminal and the server. This type of technique notably makes it possible to offer a good user experience while taking into account, for example, variations in bandwidth over the link between the client terminal and the content server, here the camera on the local area network. Conventionally, different streams may be encoded or transcoded, for the same multimedia content, e.g. a digital video, corresponding to different bitrates, different resolutions, different qualities. The coding of a video is intended to supply a representation of the initial content of the video in accordance with certain parameters (average bitrate, instantaneous bitrate, coding-decoding standard used, frequency, spatial resolution, etc.) in a generally more compact form. Transcoding consists in re-encoding a video already encoded, with new parameters. Each level is itself split into time segments, also known as "fragments" (or "chunks" in English) generally corresponding to a few seconds of content. These different levels and the associated segmentation are generally described in a description file. There are multiple solutions for facilitating the provision and distribution of such streaming content, such as, for example, the Microsoft Smooth Streaming and Apple HTTP Live Streaming (HLS) proprietary solutions, or even the MPEG DASH (for Dynamic Adaptive Streaming over HTTP—ISO/IEC 23009-1:2012 (E)) standard, a standard of the ISO/IEC organization dedicated to the streaming of multimedia content over the Internet.

RTSP (from the English Real Time Streaming Protocol) also makes it possible to control the distribution of multimedia streams in streaming over an IP network. This is an application level protocol provided for operating on transport protocols such as RTP/RTCP.

Most of the video cameras on the market use either the RTSP protocol, or a progressive download protocol like Apple HLS, MPEG-DASH, etc. over HTTP. Each of the two protocol families has its advantages and its drawbacks in terms of reliability, latency, etc.

The gateway 2 conventionally comprises a NAT (Network Address Translation) router, the function of which, in a well-known way, is to match the internal IP addresses of the local area network 1 to a set of usable addresses on the wide area network 3. For managing the traversal through the NAT router, various protocols may be used, e.g. SNMP (Simple Network Management Protocol), or STUN (Simple Traversal of UDP through NATs, with UDP for "User Datagram Protocol"), or even UPnP IGD (Universal Plug and Play—Internet Gateway Device). The configuration may be done manually (via a Web interface, for example) or automatically.

Referring to FIG. 1, by way of example an initialization method is described for initializing an object of the local area network with a view to accessing it from outside the local area network, e.g. the camera 4, according to the prior art UPnP IGD. The initialization method for initializing another object of the local area network 1 (e.g. the NAS 5) would be similar. The initialization method is preferably implemented automatically during each initialization of the network, i.e. at each startup of the object 4, or each time that the equipment 4 and/or the gateway 2 changes IP address. In a first step, the camera 4 transmits a configuration request to the gateway 2 for configuring the NAT router and determining a public IP address (e.g. via a message "UPnP AddPortMapping"). This step is symbolized by the arrow F1 in FIG. 1. The gateway 2 responds to the request by transmitting a message to the equipment 4 containing a public IP address and a port number that it has chosen (e.g. 50000). This step is symbolized by the arrow F2 in FIG. 3. The camera 4 stores the public IP address and the port number, to allow later implementation of a service, e.g. access to the camera 4 stream from the user's terminal 7a, connected to the Internet network 3. The assigned port may be displayed via the Web interface of the camera, or transmitted, for example, to an application of the manufacturer. The terminal 7a takes note of this. When the user of the terminal 7a wishes to access the video stream from the camera, they are connected via their Internet browser to the public IP address of their gateway 2 on the port associated with the camera and receive the stream. This step is symbolized by the arrow F3 in FIG. 3. The following drawbacks are noted:

Since the camera 4 cannot know at what moment the client will need to access the stream, the traversal of the NAT router of the gateway is performed permanently, including when the terminal is within the local area network. This type of method is therefore not secure since anyone knowing the IP address and the port number may access the stream from the camera, which is generally not encrypted; yet today there are applications that allow the address and the port number of a connected object to be easily obtained.

once the terminal has received and accepted the camera's features, the features of the stream received from the camera will be almost always the same. Indeed, even if the techniques of adaptive streaming (HLS, DASH, etc.) make it possible to match a part of the features (notably the quality and the bitrate) these do not allow the security applied (HTTP or HTTPS), the latency (always the same and more important than other types of protocol such as RTSP) or the transport protocol of the multimedia stream to be changed.

However, it is sometimes desirable to have different features according to certain criteria linked to the terminal and/or to the network. For example:

the bitrate may be advantageously higher locally than remotely;

security may be lower locally, the risk of intrusion being less high and indeed since the video stream does not pass through third parties into the local area network, security is mainly ensured by Wi-Fi security (WPS, WPA key) or the need to be physically connected (Ethernet);

latency must be lower locally since the user who is close to the camera will not be able to accept too high a latency (i.e. a time lag) between the stream captured by the camera and the stream reproduced on their terminal;

the protocol may preferentially be RTSP locally, and HTTP remotely since the latter presents fewer problems to the passage of the multiple components of the network (firewall, proxy, router, etc.), notably of the mobile network;

security constraints may be higher for a terminal based on the iOS system than for a terminal based on an Android system. Indeed, the constraints imposed on iOS terminals are stricter (certification authority list, self-signed certificate blocked, etc.) than those imposed on Android for broadcasting HLS in HTTPS.

etc.

The invention therefore provides for using a smart device for providing the service (here, the service for accessing the camera's video stream), hereafter denoted as DMAS, typically located on the gateway, which automatically benefits from the best compromises, whether the user is local or remote.

A description will now be given of the invention supported by FIGS. 2, 3 and 4.

Figure 2:
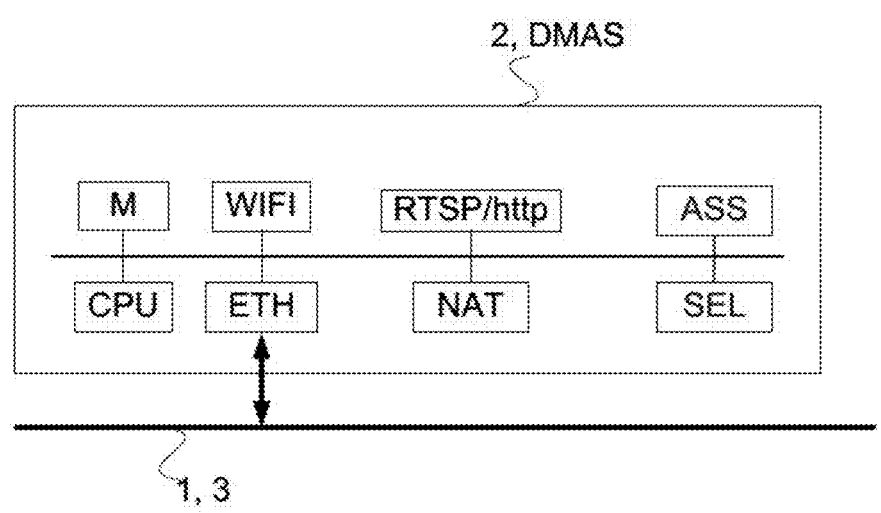
FIG. 2 represents a home gateway architecture implementing one embodiment of the invention.

FIG. 2 represents the architecture of equipment implementing one embodiment of the invention.

The gateway 2 conventionally includes memories (M) associated with a processor (CPU). The memories may be of the ROM (from the English Read Only Memory) or RAM (from the English Random Access Memory) or even Flash type. One part of the memory M notably contains, according to the invention, the software part of the inventive device. It also includes a NAT routing module, for redirecting, or routing, data packets between the various terminals and networks connected thereto. The gateway 2 further comprises a number of modules that allow it to communicate with the networks 1, 3 via different protocols over different physical links; thus FIG. 2 diagrammatically depicts an Ethernet module (ETH) allowing wired communications with the Internet network and the local area network 1, and a Wi-Fi module (WIFI) for wireless communications. An RTSP (Real Time Streaming Protocol)/HTTP module makes it possible to control the distribution of multimedia streams (streaming) on an IP network by using one or other of these protocols.

The gateway 2 finally comprises, according to the invention, a service provision device DMAS providing services on the local area network, access being local or remote. It includes notably
 a module ASS for analyzing and establishing a list of possible associations between an address for accessing the service (to the camera stream according to the chosen example) and certain features of said service,
 a decision module SEL for selecting an association (and therefore an address) in the list, according to features specific to the terminal (local or remote, etc.) which requires the service.

Figure 3:
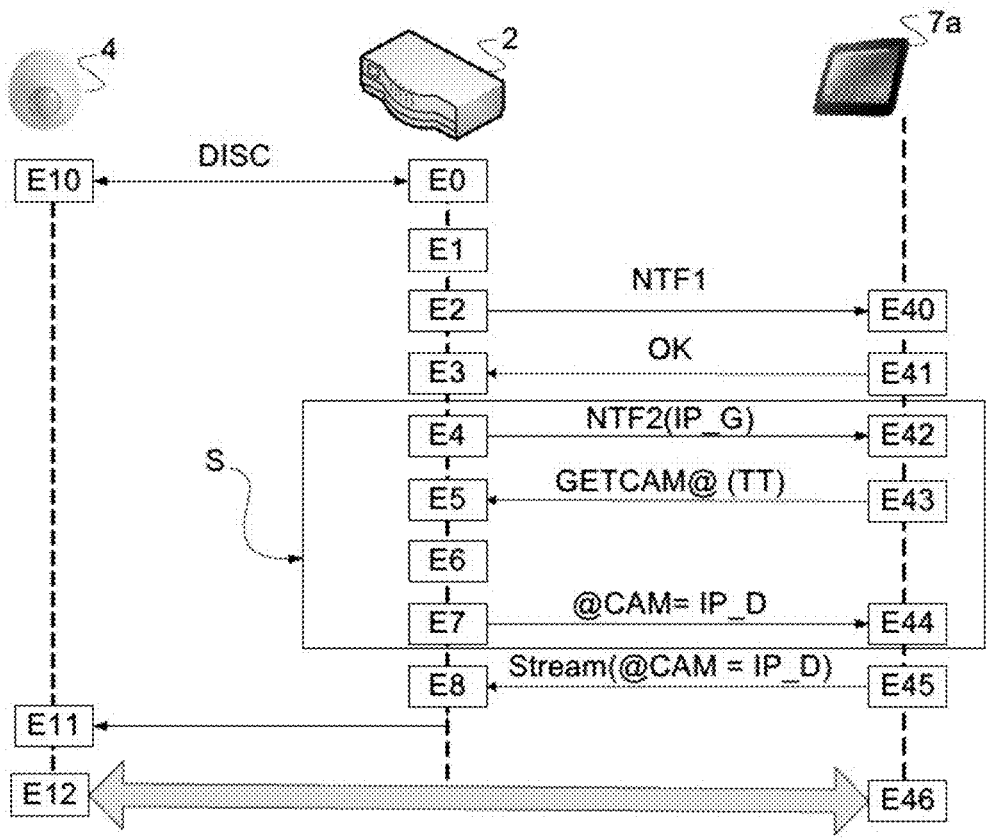
FIG. 3 represents a timing diagram of the exchanges between the various equipment according to one implementation of the invention.

FIG. 3 represents the exchanges between the client terminal 7a or 7b, the gateway 2, and the connected object 4, or camera according to this example.

This embodiment of the invention uses a number of mechanisms of known standards already mentioned (HTTP, HTTPS, RTSP, HLS, etc.).

It is recalled that the gateway is according to this example a standard Livebox gateway notably provided with a NAT router and various communication modules, as well as a service provision device providing the service (DMAS) including an association module (ASS) and a selection module (SEL). It will be noted that, in this embodiment of the invention, the service provision device providing the service is in the service gateway but could be located elsewhere in the wide area network and/or in the local area network provided that there are appropriate modules available, notably communication, association and selection modules.

The steps E0 and E10 correspond to conventional steps of camera discovery via the gateway, using the UPnP protocol according to this example. This message, denoted by DISC may take the form of a discovery message of the UPnP standard. It is recalled that the UPnP standard (from the English Universal Plug and Play), provides a set of protocols for the purpose of enabling terminals to connect and communicate within a local area network. It consists of a set of IP-based communication protocols promulgated by the UPnP standards forum ("UPnP Forum"). For controlling the terminals of the network, UPnP uses checkpoints, conventionally transmitting "discovery" messages to the various terminals of the network, in order to retrieve in return a description of the terminals corresponding to the request. Terminal equipment compatible with the UPnP standard, according to this example the camera 4 (or the NAS 5) responds to these request messages by supplying its features (terminal type, hardware and software capabilities, etc.). Any other protocol offering the same communication capabilities in the local area network could be used alternatively, such as "Apple mDNS", for example.

When it has retrieved the description of the camera, the gateway 2 records the relevant information relating to the connected object, for example:
 The MAC address of the camera, a unique address denoted by @MAC ("Media Access Control") for unambiguously identifying the terminal;
 The name of the camera (CAM) the model, the manufacturer, etc.;
 The local IP address of the camera in the local area network, hereafter denoted by IP_L;
 The port of the API (for Application Programming Interface) for configuring the camera, e.g. port number 80 if this is a standard HTTP CGI interface on this port number;
 The multimedia capabilities of the camera:
  in terms of supported protocols (adaptive streaming of the HLS, DASH type, secured or not secured by an HTTPS/HTTP, RTSP transport, etc.);
  in terms of formats (encoding, bitrates, qualities, etc.) of the media used (video, still image, audio, etc.).

In a step E1 which follows the discovery step E0, the gateway module ASS builds a set of associations between:
 one or more local addresses (IP_L) and a set of features provided by the camera;
 one or more remote addresses (IP_D) and a set of features provided by the camera.

Such a step makes it possible to end up with, for example, a representation of the type given below in the form of an association table, in which:
 the "streaming" column (STR) indicates the streaming or (progressive) downloading protocol, used for acquiring and transporting the multimedia data of the camera in real time. According to this example, the streaming protocols used may be based on HTTP(s) or RTSP.
 the "coding" column (COD) indicates the type of coding used for the video. Naturally, sound or any other media may be attached thereto with its own format without loss of generality.
 The bitrate column (BR) indicates the useful bitrate of the generated stream (which corresponds to a compromise between the quality and the compression ratio of the video) in megabits per second. This bitrate may be composed of a minimum and maximum value for adaptive protocols like HLS or DASH.
 the address column (IP_X) indicates an address for accessing the service stream, e.g. a URL or a combination (IP address: port number). It may be a local address (the address of the camera) if the terminal is local or a remote address (the address of the gateway) if the terminal is remote. In this embodiment, the use of HTTPS is preferred when the terminal is remote and RTSP in the local area network. Indeed, it is preferable to use an HLS over HTTPS protocol for security and passing through the proxies/firewalls of notably mobile networks. On the other hand, HLS over HTTPS has a high latency (of the order of thirty seconds). Locally, therefore RTSP is preferred, which is not encrypted and which has almost no latency. It will be noted that:

remote addresses all include an external IP address of the service gateway (here, 443.176.1.10 or 443.176.1.11) and a port number that may be randomly chosen;

local addresses (192.168.X.X) correspond to a conventional local area network addressing plan IPv4;

IPv6 addresses correspond to a conventional local area addressing plan IPv6 with addresses of the type "Unique Local Addresses" (in the block fd00::/8) and addresses of the type "Globally Unique Addresses" (in the block 2000:13).

the "name" column (AS_X) indicates the name of the association. A suffix "D" indicates a remote address and a suffix "L" a local address.

Example of association table built by the module ASS

| Streaming (STR) | coding (COD) | bitrate (BR) | Address (IP_X) | Name (AS_X) |
| --- | --- | --- | --- | --- |
| HLS/HTTP | MPEG4 | 1 to 4 | 143.176.1.10: 80 | AS_D1 |
| DASH/HTTP | HEVC | 2 to 4 | 143.176.1.11: 80 | AS_D2 |
| HLS/HTTPS | HEVC | 2 to 4 | 143.176.1.10: 443 | AS_D3 |
| HLS/HTTPS | HEVC | 2 to 4 | [2000:db8:0:85a3::ac1f:8001]: 443 | AS_D4 |
| RTSP | MPEG4 | 1 | 192.168.1.10: 554 | AS_L1 |
| RTSP | HEVC | 4 | 192.168.1.11: 8554 | AS_L2 |
| RTSP | HEVC | 16 | 192.168.1.12: 8554 | AS_L3 |
| RTSP | HEVC | 16 | [fd00:db8:0:85a3::ac1f:8001]: 554 | AS_L4 |

In a step E2, which may precede or follow the step E1, the gateway alerts the user of the terminal 7 and asks them if they wish to add this camera to their range of remote access services. This step is optional. This message, denoted by NTF1, may take the form of a simple SMS (Short Message Service) addressed to the terminal.

The user receives the notification in a step E40, and if they accept it, an acknowledgment message is sent back in a step E41 to the gateway, which receives the response in a step E3 (denoted by OK).

In a step E4, the gateway transmits a notification to the terminal with an address (URL or combination IP/port, etc.) denoted by IP_G. According to this example this is a generic address corresponding to that of the gateway (external address on the wide area network) which will subsequently manage the assignment of a local or remote address to the terminal. According to a variant depicted in FIG. 4, two addresses are supplied to the terminal in a step E4 (a local address IP_L, and a remote address IP_D).

In a step E5 that follows it, the user of the terminal having decided to access the stream from the camera, the gateway receives a request from the terminal to obtain the address of the camera. This request may contain information that could be used in step E6 e.g. the type of terminal (10S or Android), the decoding capability of the video streams (support of RTSP or certain codecs), the type and capabilities of the network components between the terminal and the gateway. This step is denoted in the figure by GETCAM@(TT) by way of illustration, the parameter TT corresponding to the type of terminal.

In a step E6, the gateway determines one or more criteria relating to the terminal which has transmitted the request, or to the network this terminal is on, and selects an address according to this criterion/these criteria. According to the example given in support of this embodiment, the selection is made on the basis of the association table described above, and the first criterion used is the local/remote criterion. It is recalled that, according to the invention:

a local address (IP_L) may be used for direct access to the stream when the terminal 7b is in the local area network, on condition of being actually connected to the local area network (e.g. via its Wi-Fi module; if the Wi-Fi module is turned off, naturally it can use a remote address and go through the 3G/4G mobile network).

a remote address (IP_D) may be used for accessing the stream when the terminal is remote; it points to the external network IP address of the gateway, to which a preferably random port number is assigned.

For determining whether a user is local or remote the module SEL of the gateway may rely on various elements that are available. Indeed, at any time the gateway 2 has in memory a list (table of identifiers including the unique identifiers of the home terminals that have already been authorized to access the home network via the access point, routing elements, etc.) of all the terminals on the local area network and can indicate via a single table lookup whether or not a given terminal is connected to the gateway.

Any other alternative within the grasp of the person skilled in the art (querying a manufacturer's server, etc.) may be used alternatively.

Another criterion may then be used for the final selection of the stream in the list of possible associations. E.g. a bitrate criterion: if the terminal is local (criterion 1) and can support a high bitrate (criterion 2) the address 192.168.1.12: 8554 corresponding to the association AS_L3 (bitrate of 16 Mbps) may be assigned thereto. However, if the local area network is saturated, it may be assigned the address of AS_L1 (bitrate of 1 Mbps).

At the end of this step, the gateway transmits the selected address to the terminal, in a step E7. In the example in FIG. 4, since the terminal 7a is remote, the message @CAM=IP_D symbolizes transfer to the terminal of a remote address. It may, for example, be an HTTP/RTSP redirect message.

It will be noted that this step must be repeated if it contains the local IP address (just like the steps E0 and E1) when the camera and/or the gateway changes address (e.g. because the gateway has been reset).

In a step E45, the application on the user's terminal 7 accesses the stream. This message, denoted by STREAM (@CAM) may take, for example, the form of a message HTTP/RTSP GET (Get Camera streaming URL with IP/port)

On receiving this message, the gateway "opens" the NAT (or firewall) in a step E8, i.e. it establishes an opening, or route, between the camera (specified by its private IP address—IP_L—and its private port number) and the external address of the gateway, or remote address IP_D. Naturally, if a local address has been supplied, NAT intervention is not necessary.

The steps E4 to E7 and their corresponding steps on the terminal are denoted as belonging to the block "S" according to this first embodiment of the invention.

Figure 4:
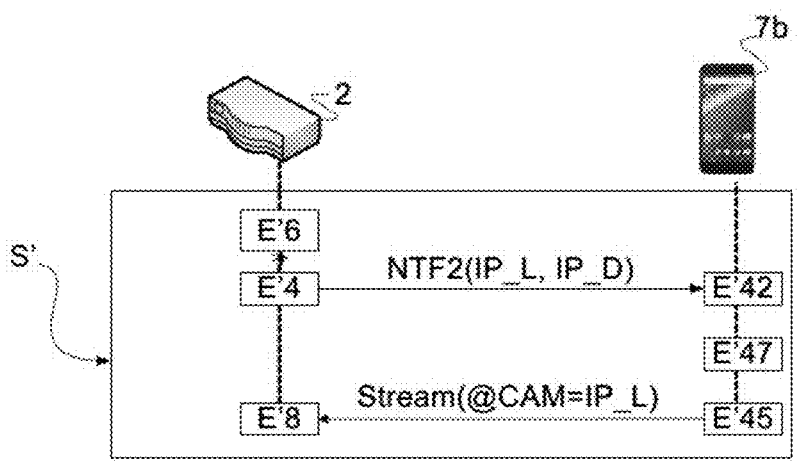
FIG. 4 represents a timing diagram of the exchanges between the various equipment according to another implementation of the invention.

FIG. 4 represents another embodiment for which the set of steps S is replaced by a set S', while steps E0 to E3 are the same.

In this variant, two addresses are supplied to the terminal in a step E'4 (local address IP_L, remote address IP_D). These two addresses are derived from the result of the selection made by the module SEL of the gateway in a prior step E'6 during which two addresses (one local and one remote) were selected by the method according to the invention, e.g. the addresses of the associations AS_D1 and AS_L1. These two addresses may be, as described in support of the preceding step E6, selected on the basis of a number of criteria (bitrate, latency, protocol, etc.). It will be noted that this step must be repeated when the camera and/or the gateway changes address (e.g. because the gateway has been reset) since it contains the local IP address.

In a step E'47, the terminal chooses the address that it will use to access the camera, preferably the remote address if it is outside the local area network and the local address when it is located in the local area network (connected to the service gateway). Any technique within the grasp of the person skilled in the art may be used for deciding whether the terminal uses the local address or the remote address. It may, for example, be conceivable to put in place, at the level of the terminal, a simple mechanism consisting, once the two addresses have been acquired (local address and remote address) in choosing between a local access (LAN) and a remote access (WAN). The LAN may be tried via the local address, then in case of an error (invalid local address), the WAN may be tried successively via the remote address. According to another example, the fact could be used that the terminal is connected to the local area network (Wi-Fi) or to the mobile network (4G or other). However, it will be noted that it could be connected to a Wi-Fi network other than the home network. In order to be sure to be on the correct Wi-Fi network, there should also be a mechanism for detecting and storing the SSID of the gateway or the geolocation of the house. Then, subsequently, this information should be verified before attempting access on the LAN.

It goes without saying that the embodiment that has been described above has been given purely as a guide and is in no way restrictive, and that numerous modifications may easily be made by the person skilled in the art without, however, departing from the scope of the invention.

The invention claimed is:

1. A method for managing a remote communication service offered by an object of a local area network to at least one terminal of a communications network, the terminal and the object being capable of communicating via a gateway of the local area network, wherein said method comprises the following steps on a service provision device for supplying the terminal with at least one service address for accessing the service offered by the object:
    establishing, for said service offered by the object, a list of associations, each association in the list comprising at least one feature of the service and at least a service address for accessing from the terminal the service offered by the object, said at least a service address being associated to said at least one feature of the service;
    obtaining at least one criterion linked to the terminal;
    comparing the at least one criterion obtained to the features of the list of associations;
    selecting one service local address and one service remote address in the list of associations according to said criterion linked to the terminal;
    sending to the terminal the selected local service address and service remote address, the terminal choosing one of said service local address or service remote address for accessing the service offered by the object.

2. The method according to claim 1, wherein the selection step of selecting at least one association is preceded by steps of:
    sending to the terminal an address of the service gateway;
    receiving, from the terminal, a request for accessing the service;
    determining at least said criterion linked to the terminal according to the request received.

3. The method according to claim 1, in which:
    the feature of the service is related to a connection criterion indicating whether the terminal is connected to the local area network of the service gateway;
    the criterion linked to the terminal indicates whether the terminal is connected to the local area network of the service gateway.

4. The method according to claim 3, wherein the selection step determines:
    a first association comprising the service local address for a connection criterion indicating that the terminal is connected to the local area network of the service gateway;
    a second association comprising the service remote address for a connection criterion indicating that the terminal is not connected to the local area network of the service gateway;
    and the step of sending transmits to the terminal the service local address of the service of the first association and the service remote address of the service of the second association that have been determined.

5. The method according to claim 1, in which:
    the feature of the service is related to a bitrate criterion;
    the criterion linked to the terminal indicates the useful bitrate of the terminal.

6. The method according to claim 1, in which:
    the feature of the service indicates the protocol used for communication;
    the criterion linked to the terminal indicates whether the terminal is capable of managing this type of protocol in said communication network.

7. The method according to claim 1, further comprising a step of discovery of the connected object.

8. An access method, on a terminal in a communications network, for accessing a remote communication service offered by an object of a local area network, the terminal and the object being capable of communicating with a service gateway of the local area network, wherein said method comprises the following steps on the terminal:
    receiving a notification message from a service provision device, said notification message comprising at least one local and one remote address of the service offered by the object;
    obtaining a criterion linked to the terminal, the criterion indicating whether the terminal is connected to the local area network of the service gateway or indicating a useful bitrate of the terminal;
    selecting an address of the service from the at least one local address and one remote address, according to said criterion linked to the terminal.

9. A device for managing a remote communication service offered by an object of a local area network to at least one terminal of a communications network, the terminal and the object being capable of communicating via a gateway of the local area network, wherein the device comprises:
    a processor;
    a non-transitory computer-readable medium comprising instructions stored thereon, which when executed by the processor configure the device to perform steps comprising:
    establishing, for said service offered by the object, a list of associations, each association in the list comprising at least one feature of the service and at least a service address for accessing from the terminal the service offered by the object, said at least a service address being associated to said at least one feature of the service;

obtaining at least one criterion linked to the terminal;

comparing the at least one criterion obtained to the features of the list of associations;

selecting one service local address and one service remote address in the list of associations according to said criterion linked to the terminal;

sending to the terminal the selected one service local address and one service remote address, the terminal choosing one of said selected service local address or service remote address for accessing the service offered by the object.

10. A gateway including the device for managing a remote communication service according to claim 9.

11. A terminal in a communications network for using a remote communication service offered by an object of a local area network, the terminal and the object being capable of communicating with a service gateway of the local area network, said terminal comprising:

a processor;

a non-transitory computer-readable medium comprising instructions stored thereon, which when executed by the processor configure the device to perform steps comprising:

receiving a notification message from a service provision device, said notification message comprising at least one local address and one remote address of the service offered by the object;

obtaining a criterion linked to the terminal, the at least one criterion linked to the terminal indicating whether the terminal is connected to the local area network of the service gateway or indicating a useful bitrate of the terminal;

selecting an address of the service from the at least one local address and one remote address according to said criterion linked to the terminal.

12. A non-transitory computer-readable medium comprising a computer program stored thereon, the program including code instructions which, when the program is executed by a processor of a management device, configures the management device to perform a method of managing a remote communication service offered by an object of a local area network to at least one terminal of a communications network, the terminal and the object being capable of communicating via a gateway of the local area network, wherein said method of managing comprises the following acts performed by the management device for supplying the terminal with at least one service address for accessing the service of the object:

establishing, for said service offered by the object, a list of associations, each association in the list comprising at least one feature of the service and at least a service address for accessing from the terminal the service offered by the object, said at least a service address being associated to said at least one feature of the service;

obtaining at least one criterion linked to the terminal;

comparing the at least one criterion obtained to the features of the list of associations;

selecting one service local address and one service remote address in the list of associations according to said criterion linked to the terminal;

sending to the terminal the selected one service local address and one service remote address, the terminal choosing one of said selected service local address or one service remote address for accessing the service offered by the object.

13. A non-transitory computer-readable medium comprising a computer program stored thereon, the program including code instructions which, when the program is executed by a processor of a terminal, configures the terminal to perform a method of accessing a remote communication service offered by an object of a local area network to at least the terminal, the terminal and the object being capable of communicating via a service gateway of the local area network, and wherein the method of managing comprises:

receiving a notification message from a service provision device, said notification message comprising at least one local address and one remote address of the service offered by the object;

obtaining a criterion linked to the terminal, the criterion indicating whether the terminal is connected to the local area network of the service gateway or indicating a useful bitrate of the terminal;

selecting an address of the service from the at least one local address and one remote address, according to said criterion linked to the terminal.

14. A method for managing a remote communication service offered by an object of a local area network to at least one terminal of a communications network, the terminal and the object being capable of communicating via a service gateway of the local area network, wherein said method comprises the following steps on a service provision device for supplying the terminal with at least one service address for accessing the service of the object:

establishing, for said service offered by the object, a list of associations, each association in the list comprising at least one feature of the service and at least a service address for accessing from the terminal the service offered by the object, said at least a service address being associated to said at least one feature of the service;

obtaining at least one criterion linked to the terminal, the at least one criterion linked to the terminal indicating whether the terminal is connected to the local area network of the service gateway or indicating a useful bitrate of the terminal;

comparing the at least one criterion obtained to the features of the list of associations;

selecting one service local address and one service remote address in the list of associations according to said criterion linked to the terminal;

sending to the terminal the selected one service local address and one service remote address, the terminal choosing one of said selected service local address or one service remote address for accessing the service offered by the object.

* * * * *